J. M. McNAMARA.
QUICK DETACHABLE COMBINED DUST AND AIR CAP FOR VALVE STEMS.
APPLICATION FILED OCT. 2, 1919.
1,331,347.  Patented Feb. 17, 1920.
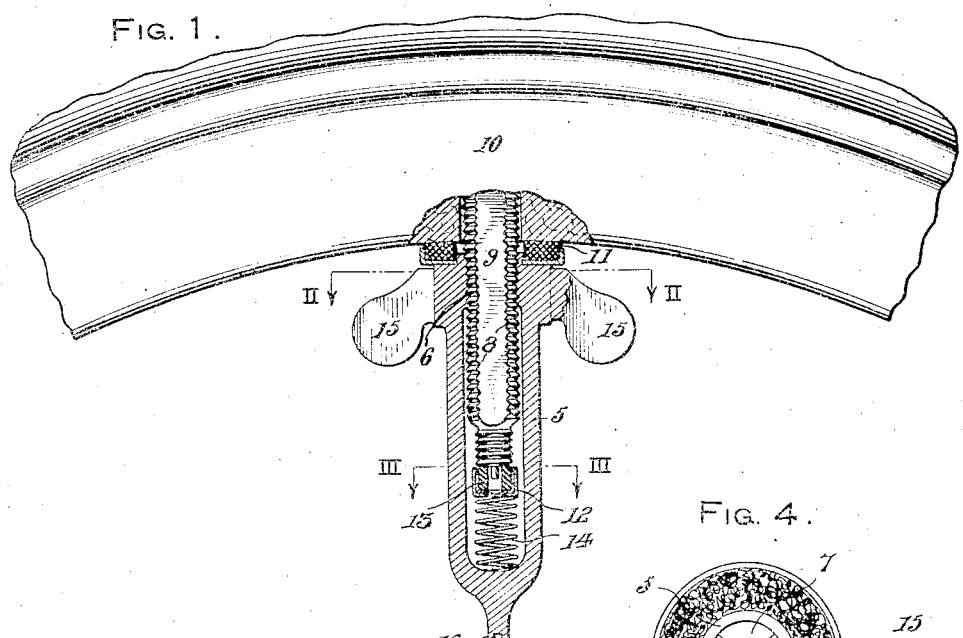
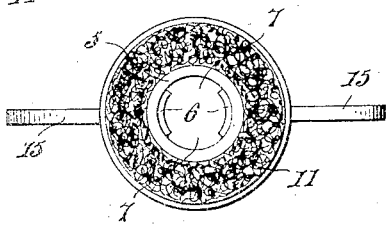
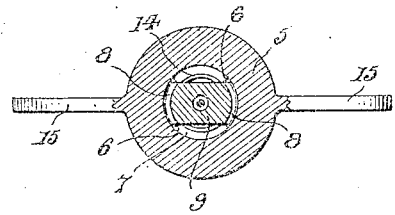
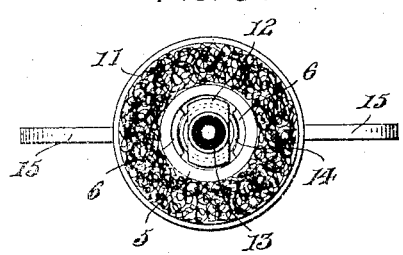
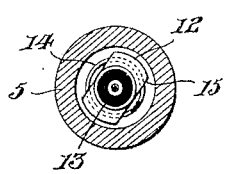
Inventor
Joseph M. McNamara
By A. M. Wilson
Attorney

UNITED STATES PATENT OFFICE.

JOSEPH M. McNAMARA, OF CLINTON, MASSACHUSETTS.

QUICK-DETACHABLE COMBINED DUST AND AIR CAP FOR VALVE-STEMS.

1,331,347.  Specification of Letters Patent.  Patented Feb. 17, 1920.

Application filed October 2, 1919. Serial No. 327,893.

*To all whom it may concern:*

Be it known that I, JOSEPH M. MCNAMARA, a citizen of the United States of America, residing at Clinton, in the county of Worcester and State of Massachusetts, have invented certain new and useful Improvements in Quick-Detachable Combined Dust and Air Caps for Valve-Stems, of which the following is a specification.

This invention relates to improvements in quick detachable combined dust and air caps for valve stems, and more particularly to improvements in that class of valve stem caps which are used in connection with pneumatic tires, such as automobile tires, the object of the invention being to provide a combined dust and air cap for such valve stems which can be placed on the stem and very easily, quickly and firmly locked thereon against displacement, without the necessity of screwing the cap for the entire length of the stem, and by means of which the time consumed in removing and replacing the cap is reduced to a mere fraction of the time necessary to perform this function with the commonly used dust and air caps.

In the drawings accompanying and forming part of this specification,

Figure 1 is a side elevation, partly broken away, of a portion of a felly of a wheel showing my improved valve stem cap applied thereto, the cap being shown in section, Fig. 2 is a transverse sectional view taken substantially upon line II—II of Fig. 1, Fig. 3 is a transverse sectional view taken substantially upon line III—III of Fig. 1, Fig. 4 is a bottom plan view of the dust cap with the air cap and spring removed, Fig. 5 is a view similar to Fig. 4 with the air cap in position for insertion within the dust cap, Fig. 6 shows the air cap in side and edge views, and Fig. 7 is an elevational view of the spring for seating the air cap and preventing accidental displacement of the dust cap.

Similar reference characters indicate corresponding parts throughout the several figures of the drawings.

Practically all valve stems now in use for inner tubes of automobile tires are flattened on two sides and threaded to a standard diameter and pitch for a greater portion of their length, and the dust caps are threaded to the same pitch and screwed on such stems substantially for the entire length of the stem which projects through the felly of the wheel. Moreover, the free end portions of these valve stems are reduced and threaded to a standard diameter and pitch, and small air caps are threaded onto these reduced threaded portions of the stem to insure against leakage in case the valve within the stem should leak. Obviously, considerable time is consumed in first removing these dust caps and then removing the air caps for such purposes as inflating the tire, or the like. The present invention, which aims to provide means for simultaneously effectively closing the free end of the valve stem and protecting the valve stem from dust in an expeditious manner, comprises a dust cap 5 which is threaded only at one portion of its length, as for instance its outer end, as at 6, and these threads do not extend around the entire inner wall of the bore of the cap, but are broken away at opposite portions, as shown at 7, Figs. 2 and 4, corresponding to the threaded portions 8 of the valve stem 9. The purpose of thus forming the threads in the bore of the cap is to enable the cap to be slid over the stem as far as required without the necessity of screwing or unscrewing said cap, and by a single turn or twist of the cap to bring its threads into engagement with the threads on the stem to thereby retain the cap on such stem. Due to the friction set up between the abutting faces of the felly 10 and the washer 11 which is suitably carried at the open end of the cap 5, the latter is additionally held against turning.

An air cap 12 is located within the dust cap 5 for closing the free end of the stem 9 and, although this air cap may be of any preferred construction, the same is herein illustrated as formed of a metallic two part shell having a rubber gasket 13 disposed therein, the exposed edge of the gasket 13 being yieldingly pressed into engagement with the adjacent free end of the valve stem 9 by means of the helical spring 14 as clearly shown in Fig. 1. In order to provide for renewal of the air cap 12, said air cap is provided with flattened sides as at 15 so as to permit ready insertion thereof into the dust cap 5 when disposed as shown in Fig. 5 and when given a quarter of a turn to assume a position in the path of the threads 6, at which time said air cap 12 is prevented from displacement outwardly of the dust cap 5. In assembling the present device, the spring 14 is inserted previous to the insertion of the air cap 12, and said spring 14 is of such length as to cause engagement of the air cap 12 with the adjacent end of the valve stem 9 before the dust cap 5 has been placed all of the way on said valve stem. Spring resistance is thus offered to the final movement of the dust cap onto the valve stem, so that when said dust cap is given the single turn or twist hereinbefore mentioned, the spring 14 acts to set up a friction between the threads 6 and 8 so as to doubly insure against accidental displacement of the caps off of the valve stem.

The cap 5 may be provided with wings 15 to be engaged by the fingers in turning the same, and the usual tire valve tool 16 may be formed on the closed end of the dust cap 5 instead of on the air cap as has been the case heretofore.

It is believed that the construction and operation as well as the advantages of the present invention will be readily understood and appreciated from the foregoing description by those skilled in the art.

While the form of the invention herein shown and described is what is believed to be the preferable embodiment thereof it is nevertheless to be understood that minor changes may be made in the form, combination, and arrangement of parts without departing from the spirit and scope of the invention as claimed.

What I claim is:—

The combination with a valve stem having a mutilated thread, and a dust cap longer than the projecting portion of said stem and having a mutilated interior thread, of an air cap slidably disposed within said dust cap, and a spring within the dust cap for yieldingly pressing the air cap into engagement with the free end of said valve stem prior to the final movement of the dust cap on such stem, said air cap being provided with flattened sides whereby the same may be inserted in the dust cap, and when turned, retained in said dust cap by means of said mutilated interior thread of the dust cap.

In testimony whereof I affix my signature.

JOSEPH M. McNAMARA.